(12) United States Patent
Pic

(10) Patent No.: US 10,108,894 B2
(45) Date of Patent: Oct. 23, 2018

(54) ANTI-COUNTERFEIT LABEL HAVING INCREASED SECURITY

(71) Applicant: WISEKEY SEMICONDUCTORS, Meyreuil (FR)

(72) Inventor: Pierre Pic, Ceyreste (FR)

(73) Assignee: WISEKEY SEMICONDUCTORS, Meyrevil (FR)

( * ) Notice: Subject to any disclaimer, the term of this patent is extended or adjusted under 35 U.S.C. 154(b) by 0 days.

(21) Appl. No.: 15/740,990

(22) PCT Filed: Jun. 14, 2016

(86) PCT No.: PCT/FR2016/051434
§ 371 (c)(1),
(2) Date: Dec. 29, 2017

(87) PCT Pub. No.: WO2017/001739
PCT Pub. Date: Jan. 5, 2017

(65) Prior Publication Data
US 2018/0197057 A1    Jul. 12, 2018

(30) Foreign Application Priority Data

Jun. 29, 2015   (FR) ..................... 15 56076

(51) Int. Cl.
G06K 7/08     (2006.01)
G06K 19/06    (2006.01)
G06K 19/07    (2006.01)

(52) U.S. Cl.
CPC ..... G06K 19/0723 (2013.01); G06K 19/0707 (2013.01)

(58) Field of Classification Search
USPC ................................ 235/451, 492
See application file for complete search history.

(56) References Cited

U.S. PATENT DOCUMENTS

| | | | | |
|---|---|---|---|---|
| 6,050,622 A | * | 4/2000 | Gustafson | E06B 9/68 292/307 R |
| 6,693,544 B1 | * | 2/2004 | Hebbecker | G06K 19/02 235/487 |
| 7,898,422 B2 | * | 3/2011 | Puccini | B65D 39/0058 340/572.1 |

(Continued)

FOREIGN PATENT DOCUMENTS

| EP | 1 835 448 A1 | 9/2007 |
|---|---|---|
| EP | 1 857 374 A1 | 11/2007 |

OTHER PUBLICATIONS

Aug. 25, 2016 Search Report issued in International Patent Application No. PCT/FR2016/051434.

*Primary Examiner* — Tuyen K Vo
(74) *Attorney, Agent, or Firm* — Oliff PLC

(57) ABSTRACT

The invention relates to a near field magnetically coupled contactless tag, comprising a substrate comprising a rupture zone; a master microcircuit arranged on the substrate on one side of the rupture zone, and configured to be interrogated by a near-field reader; a slave microcircuit arranged on the substrate on the other side of the rupture zone; and a sacrificial link connecting the two microcircuits, wherein the two microcircuits are configured to negotiate mutual authentication through the sacrificial link.

7 Claims, 2 Drawing Sheets

(56) References Cited

U.S. PATENT DOCUMENTS

| | | | |
|---|---|---|---|
| 2004/0066296 A1* | 4/2004 | Atherton | G08B 13/1445 340/572.1 |
| 2005/0242957 A1* | 11/2005 | Lindsay | G06K 19/0716 340/572.7 |
| 2006/0097877 A1* | 5/2006 | Baba | G06K 19/073 340/572.4 |
| 2007/0069895 A1* | 3/2007 | Koh | G06K 19/02 340/572.1 |
| 2007/0152829 A1* | 7/2007 | Lindsay | G06K 19/0717 340/572.3 |
| 2007/0210173 A1 | 9/2007 | Nagel | |
| 2010/0141384 A1* | 6/2010 | Chen | B65D 41/3409 340/10.1 |
| 2014/0263659 A1* | 9/2014 | Kervinen | G06K 19/027 235/488 |
| 2015/0178614 A1* | 6/2015 | Lin | H04W 4/80 235/375 |

* cited by examiner

ANTI-COUNTERFEIT LABEL HAVING INCREASED SECURITY

FIELD

The invention relates to near field magnetically coupled contactless identification devices, e.g. NFC (Near Field Communication), ISO 14443, or ISO 15693 devices, and more specifically to an anti-counterfeiting contactless device for ensuring authenticity of the contents of a bottle.

BACKGROUND

U.S. Pat. No. 7,898,422 describes an anti-counterfeiting NFC device integrated in a wine bottle cork. The device is arranged so that the insertion of a corkscrew damages the antenna or the control microcircuit.

When the device is intact, it can be interrogated remotely by an NFC reader to retrieve information on the product, and also to confirm the authenticity of the information. When the cork has been removed, the NFC device is damaged, so that the cork cannot be reused to authenticate the content of a new bottle.

US patent application 2007-0210173 describes an RFID tag in two parts, each of which includes an independent RFID component having cryptographic functions. A tag rupture renders one of the two RFID components inoperative. A reader device is programmed to signal that the tag is intact if it manages to negotiate authentication with both RFID components of the tag. The tag is considered as damaged if only one authentication can be negotiated.

SUMMARY

A near field magnetically coupled contactless tag is provided in general, comprising a substrate comprising a rupture zone; a master microcircuit arranged on the substrate on one side of the rupture zone, and configured to be interrogated by a near-field reader; a slave microcircuit arranged on the substrate on the other side of the rupture zone; and a sacrificial link connecting the two microcircuits, wherein the two microcircuits are configured to negotiate mutual authentication through the sacrificial link.

The tag may comprise an antenna configured to supply power to the master microcircuit, the sacrificial link being configured to power the slave microcircuit from the master microcircuit.

The sacrificial link may comprise a conductive track configured in a loop crossing a second rupture zone.

The sacrificial link may comprise a meander-shaped conductive track occupying a region of interest of the substrate such that a piercing of the region of interest breaks the conductive track.

The tag may comprise two facing metal surfaces arranged on opposite faces of the substrate in a region of interest of the substrate, configured such that a piercing of the region of interest causes a permanent short-circuit between the two metal surfaces, wherein the metal surfaces are connected to the slave microcircuit so that the short-circuit prevents the operation of the slave microcircuit.

The two microcircuits may be of the same type, each comprising two specific pins designed to supply power to an external circuit when the microcircuit is connected to an antenna, or to receive an external power supply when the microcircuit is not connected to an antenna.

The master microcircuit may be configured to implement near field communication technology and the slave microcircuit be configured to implement a different communication technology.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

In the context of the aforementioned U.S. Pat. No. 7,898,422, once the bottle has been opened, the NFC device becomes silent. However, the user may wish to consult the information again, for example to share it with a friend, or visit the producer's website to order new bottles. This functionality is not available, since the security of the anti-counterfeiting device is based on the destruction of the NFC device.

In the aforementioned US patent application 2007-0210173, each RFID component is independent and designed to communicate with a reader device without cooperation with the second RFID component. The RFID component that remains operational after rupture of the tag can therefore continue to communicate information to the reader device. However, the system is relatively easy to compromise, because the portion of the tag that has been separated can be repaired individually to make its RFID component operational again. It is then sufficient to put the two parts of the tag together on a non-genuine product to foil an authenticity check.

Contactless anti-counterfeiting devices, for example of the NFC type, are proposed herein for containers, in particular bottles or flasks, which are difficult to compromise while offering a simple reading of information when the container has been opened.

Figure 1:
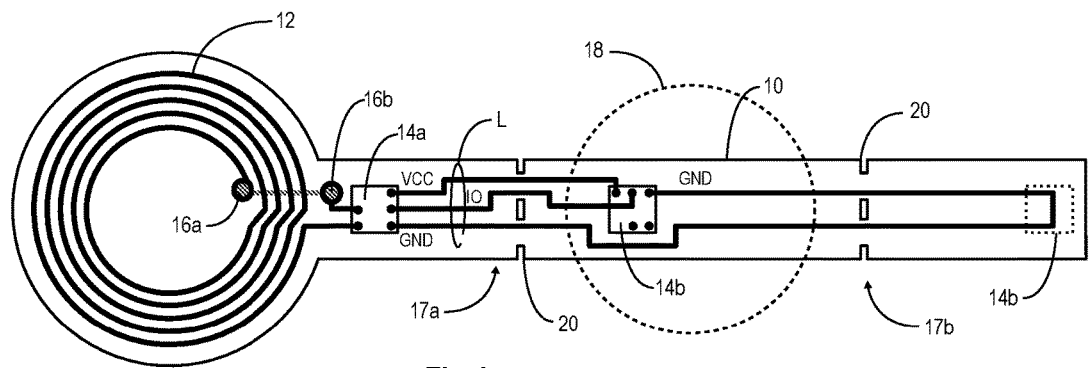
FIG. 1 shows an embodiment of an anti-counterfeiting NFC tag for a bottle.

FIG. 1 illustrates a first embodiment of an enhanced security anti-counterfeiting NFC tag. The tag is in the form of a tape 10 of insulating material serving as a substrate to form conductive tracks according to common manufacturing techniques for RFID tags. One end of the tape is enlarged to accommodate an NFC antenna 12 formed of several turns of a conductive track.

A microcircuit 14 is mounted near the connection between the tape 10 and the antenna 12 and is connected to the antenna terminals by a track on the same side as the antenna, and a track on the opposite side, joining the end of the inner turn of the antenna through a via 16a. A via 16b connects the microcircuit 14a to the track of the opposite face.

Further on the tape 10, beyond a rupture zone 17a, a second, "slave" microcircuit 14b is attached, which can be of the same type as the microcircuit 14a, or "master" microcircuit. The two microcircuits may be of the type marketed under the name VaultIC™ 152 by Inside Secure. Such a microcircuit has two pins for connecting the antenna, two power supply pins GND and VDC, and a programmable input/output pin IO. When an antenna is used, as for the master microcircuit 14a, the VCC and GND pins can be used to supply other circuits from the energy supplied to the antenna. When there is no antenna, as for the slave microcircuit 14b, the pins VCC and GND may be used to supply the microcircuit through an external source (here the microcircuit 14a).

The microcircuits 14a and 14b are configured to negotiate mutual authentication through a sacrificial link L, implemented here by three conductive tracks interconnecting the microcircuits and crossing the rupture zone 17a. One of the tracks may, as shown, have a loop that extends to the distal end of the tape 10 beyond a second rupture zone 17b.

The microcircuits 14a and 14b may be assembled according to the so-called "flip-chip" technique or by gluing with a conductive glue. The master microcircuit 14a integrates NFC device management functions. Since the device offers an authentication function, it is of the active type, that is to say, the microcircuit 14a integrates a microcontroller and cryptographic functions. The microcircuit 14a then draws its power from the energy supplied to the antenna 12 by an NFC reader, which can be a smartphone, tablet, watch, etc. provided with an NFC interface.

The slave microcircuit 14b, also incorporating a microcontroller and cryptographic functions, may be powered by the master microcircuit 14a. As previously indicated, the microcircuit 14a may have two pins VCC and GND serving to supply other circuits from the energy supplied to the antenna 12. These pins VCC and GND are connected to corresponding supply pins of the slave circuit 14b by conductive tracks forming part of the sacrificial connection L between the two microcircuits. The sacrificial link L is completed by a communication track which connects an input/output pin IO of the microcircuit 14a to a corresponding pin of the microcircuit 14b. Any one of the tracks of the sacrificial link, here the GND supply track, may form the loop which crosses the rupture zone 17b.

With this configuration, when a reader device, such as a smartphone of a consumer, approaches the antenna 12, the microcircuit 14a is powered. The power supply is transmitted to the microcircuit 14b through the sacrificial link L, whereby the two microcircuits start their programmed functions.

The master microcircuit 14a may be programmed for initiating a mutual authentication at startup with the slave microcircuit 14b through the IO line. The slave microcircuit 14b is then programmed for waiting for the authentication request at startup on the IO line and responding thereto through this same line.

If the mutual authentication succeeds, the microcircuit 14a may indicate to the reader device that the product is genuine. The consumer will then be able to carry out an external authentication, using keys contained in the master microcircuit 14a, that serve to confirm that the product conforms to the information provided by the tag via an authentication server and a dedicated application. In addition, using the same application or a generic application, the consumer will be able to consult the product's characteristics, even if the mutual authentication has failed, for example the type of information that may appear on a paper tag of a wine bottle. Several bottles of a same batch may have tags sharing the same identifier or key.

The tag is configured to be attached to a container, for example a bottle, so that the central portion of the tape is placed across a closure element 18 of the container, for example a cap. It is desired that the tape be broken, also causing the rupture of at least one track crossing any of the rupture zones 17a, 17b, when the bottle is opened, that is to say when the cap 18 is removed.

A rupture in any one of the tracks crossing the zone 17a or 17b compromises the operation of the slave microcircuit 14b, either by the interruption of its power supply (VCC and GND tracks), or by severing the link used for carrying out the mutual authentication operation (IO track). In any case, the microcircuit 14b remains silent upon start-up of the microcircuit 14a, causing mutual authentication to fail.

The tracks are usually aluminum, making it difficult to repair severed tracks by welding or brazing due to the insulating oxide layer that forms on aluminum upon exposure to air.

With appropriate equipment, an ill-intentioned person may, however, recreate missing connections on a tag fragment, for example by bypassing two segments of a loop that was interrupted when the tag was broken. If the operation of the tag is based on the sole continuity of the loop, then its security is compromised.

The security of the tag of FIG. 1 is based in particular on the establishment of a mutual authentication between microcircuits 14a and 14b. If the tag is broken in zone 17a, an ill-intentioned person faces several difficulties in recreating an operational tag. This person should first have the knowledge that only one of the fragments of the tag, even the one with the fully operational master microcircuit 14a, is not enough to obtain an operational tag. The person should then be in possession both fragments, and restore the connections between the two fragments. However, even with sophisticated equipment, it is particularly difficult to permanently restore connections between tracks of two tag fragments.

If by chance a tag of the type of FIG. 1 is broken only in the zone 17b, the microcircuit 14b would no longer be powered because the loop of the track GND is broken. The tag fragment including the microcircuits 14a, 14b could however be repaired by short-circuiting the interrupted segments of the GND track.

To compromise this type of repair, the microcircuit 14b may be placed beyond the zone 17b, as shown in dashed lines, so that the sacrificial link L, i.e. the supply tracks VCC, GND, and the IO communication track, crosses the two rupture zones 17a and 17b.

To promote rupture of the tag, the attachment of the tape to the container is designed to be more resilient than the tape. A high bonding strength may be obtained with glue, and the required resilience may be ensured by gluing the tape over a sufficient surface area.

The resilience of the tape may also be reduced by providing, as shown, breaking points in the zones 17a, 17b. Preferably, these breaking points are located at the edge of the bonding area of the tape, which causes a rupture-promoting stress.

The tape may be bound to the container by the face bearing the majority of the conductive tracks. The adhesive force of the tracks to the container is generally higher than the adhesive force of the tracks to the tape. As a result, any attempt to remove the tag causes tearing of the conductive tracks, which remain stuck to the container.

An anti-counterfeiting NFC tag of the type of FIG. 1 is effective in identifying bottles that have been uncorked and potentially refilled with a product of questionable origin. However, they do not detect the removal or replacement of content using a syringe, for example using the Coravin™ process, where the cork is pierced with a syringe and the content is extracted while injecting an inert gas into the bottle. Such a technique would leave the tag intact.

Figure 2:
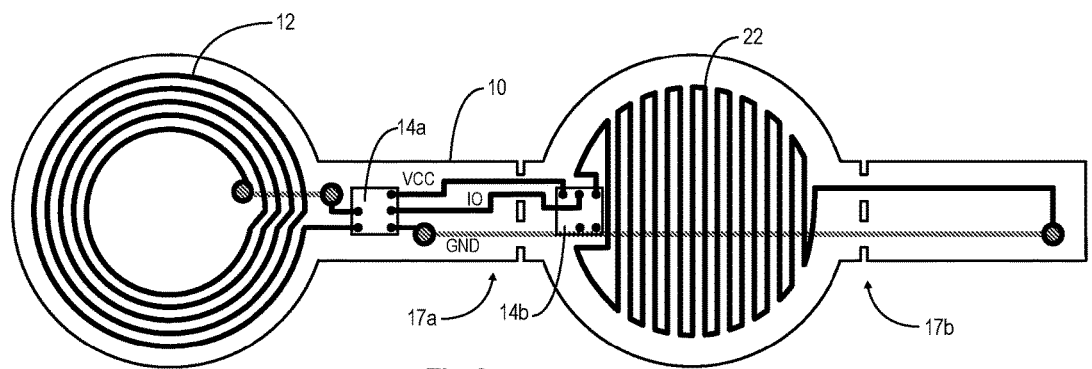
FIG. 2 shows another embodiment of an anti-counterfeiting NFC tag for a bottle.

FIG. 2 illustrates an embodiment of an NFC tag that can detect a cork piercing attempt. The central zone of the tape 10 intended to go over the cork is extended to occupy the surface of the cork and the neck of the bottle. One of the tracks of the sacrificial link, here the GND track, has, in the region of interest to be protected, a tight meander configuration 22 occupying the entire surface of this region.

As shown, starting from the microcircuit 14a, the GND track may cross the substrate through a via, extend on the rear face of the substrate to the distal end of the tape, and return to the front face through another via.

The pitch of the meanders is preferably smaller than the diameter of the syringe, so that insertion of the syringe breaks the track in at least one location, depriving the microcircuit 14b of power.

If the meander track segment 22 cannot be configured with a sufficiently small pitch, the corresponding track segment on the rear face of the substrate may be configured as a complementary meander, which virtually divides the pitch by two.

Figure 3:
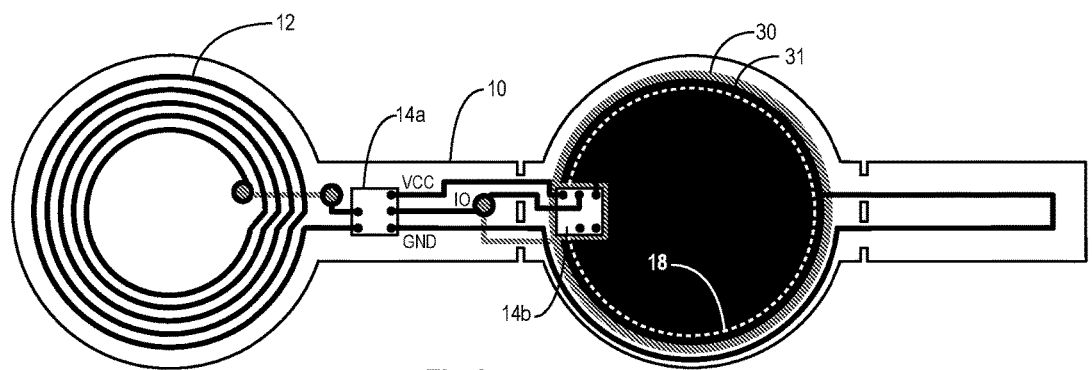
FIG. 3 shows another embodiment of an anti-counterfeiting NFC tag for a bottle.

FIG. 3 illustrates another embodiment of an NFC tag that can detect a cork piercing attempt. The central zone of the substrate covering the cork 18 and the neck of the bottle comprises two facing metal surfaces, one 30 formed on the rear face of the substrate (greyed) and the other 31 on the front face of the substrate (in black). The metal surfaces are not shown the same size in order to distinguish them in the figure—in practice they are the same size and fill the region of interest corresponding to the top of the cork.

One of the surfaces, here the surface 31, may be connected to the GND track. The other surface 30 may be connected to the IO track. Thus, when the surfaces are short-circuited, the IO track is connected to the GND supply line, making communication between the microcircuits impossible. The two surfaces may be connected in various other ways resulting in the inactivation of the microcircuit 14b. For example, if the microcircuit 14b has a reset pin, the surfaces may be connected to force a reset when they are shorted.

The central area of the tag may be glued over its entire surface on the cork. Any attempt to access the cork then results in piercing of the two facing metal surfaces. When piercing, the plastic substrate between the two metal surfaces is compressed permanently, while the metal of the upper surface stretches, following the movement of the piercing object (a needle or corkscrew), and reaches the lower surface. The lower surface, since it lies against a glue layer that is generally harder than the substrate, deforms less than the upper surface. This results in a crimping of the deformed region of the upper metal surface with the lower metal surface, so that the two surfaces become permanently short-circuited, even upon extraction of the piercing object. This short circuit also occurs when the metal surfaces are aluminum, because aluminum is wrought in an inert atmosphere to prevent oxide formation, and the areas put in contact of both surfaces are devoid of oxide since they are protected by the substrate.

The tags of FIGS. 2 and 3 may detect two events, namely breaking of the tag and piercing of the cork. Both events have the same result, namely the interruption of communication between the two microcircuits 14a and 14b. Thus, the user knows that the product has been compromised, but he does not know how.

Figure 4:
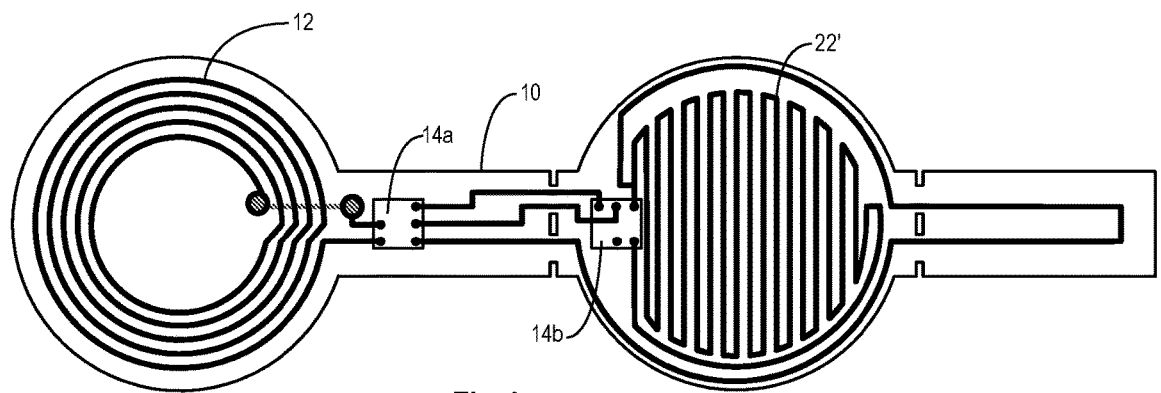
FIG. 4 shows an alternative of the tag of FIG. 2.

FIG. 4 shows an alternative of the tag of FIG. 2 that can discriminate these two events. The microcircuit 14b may have a second input/output pin. In this case, the meander segment 22' is formed independently of the GND track. The segment 22' is then connected between one of the supply terminals, for example GND, and the second input/output pin of the circuit 14b, as shown.

With this configuration, the breaking of the meander segment 22' does not prevent the operation of the microcircuit 14b, but changes the state of its second input/output terminal. The microcircuit 14b may be programmed to detect this change of state and communicate it to the master microcircuit 14a through the line IO. The master microcircuit may then signal the event to the consumer through the NFC reader. The rupture of the tag is detected as previously, by the absence of response of the slave microcircuit.

Many variations and modifications of the embodiments described herein will be apparent to the skilled person. The slave microcircuit 14b could have its own NFC antenna and thus be powered by the same field that powers the master microcircuit 14a. In this case, the VCC line between the two microcircuits could be omitted. This alternative may offer an additional degree of security in that the antennas of the two microcircuits should be sufficiently close to each other to be powered by the same reader device.

The slave microcircuit 14b could use another contactless communication technology, for example an RF technology such as UHF. The tag may then offer two reading modes, through NFC or through RF.

The tags described herein may also be used on metal containers or closure elements, by providing the underside of the tag at the location of the antenna with a layer of electromagnetic insulation, such as ferrite.

The invention claimed is:

1. A near field magnetically coupled contactless tag, comprising:
   a substrate comprising a rupture zone;
   a master microcircuit arranged on the substrate on one side of the rupture zone, and configured to be interrogated by a near-field reader;
   a slave microcircuit arranged on the substrate on the other side of the rupture zone; and
   a sacrificial link connecting the two microcircuits, wherein the two microcircuits are configured to negotiate mutual authentication through the sacrificial link.

2. The tag according to claim 1, comprising an antenna configured to supply power to the master microcircuit, the sacrificial link being configured to power the slave microcircuit from the master microcircuit.

3. The tag of claim 2, wherein the sacrificial link comprises a conductive track configured in a loop crossing a second rupture zone.

4. The tag according to claim 2, wherein the sacrificial link comprises a meander-shaped conductive track occupying a region of interest of the substrate such that a piercing of the region of interest breaks the conductive track.

5. The tag according to claim 2, comprising two facing metal surfaces arranged on opposite faces of the substrate in a region of interest of the substrate, configured such that a piercing of the region of interest causes a permanent short-circuit between the two metal surfaces, wherein the metal surfaces are connected to the slave microcircuit so that the short-circuit prevents the operation of the slave microcircuit.

6. The tag of claim 1, wherein the two microcircuits are of the same type, each comprising two specific pins designed to supply power to an external circuit when the microcircuit is connected to an antenna, or to receive an external power supply when the microcircuit is not connected to an antenna.

7. The tag of claim 1, wherein the master microcircuit is configured to implement near field communication technology and the slave microcircuit is configured to implement a different communication technology.

* * * * *

UNITED STATES PATENT AND TRADEMARK OFFICE
CERTIFICATE OF CORRECTION

PATENT NO. : 10,108,894 B2
APPLICATION NO. : 15/740990
DATED : October 23, 2018
INVENTOR(S) : Pierre Pic Page 1 of 1

It is certified that error appears in the above-identified patent and that said Letters Patent is hereby corrected as shown below:

On the Title Page

Item (73) Assignee:
Change "Meyrevil (FR)" to --Meyreuil (FR)--

Signed and Sealed this
Twenty-seventh Day of August, 2019

Andrei Iancu
*Director of the United States Patent and Trademark Office*